United States Patent
Knutson et al.

(10) Patent No.: US 9,836,469 B2
(45) Date of Patent: Dec. 5, 2017

(54) TECHNIQUES FOR PROCESSING DIGITAL ASSETS FOR EDITING IN A DIGITAL ASSET EDITING COMPUTER PROGRAM

(71) Applicant: Dropbox, Inc., San Francisco, CA (US)

(72) Inventors: Morgan Knutson, San Francisco, CA (US); Joshua Puckett, Mountain View, CA (US); Mike Myers, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 460 days.

(21) Appl. No.: 14/469,085

(22) Filed: Aug. 26, 2014

(65) Prior Publication Data
US 2015/0356105 A1  Dec. 10, 2015

Related U.S. Application Data

(60) Provisional application No. 62/009,001, filed on Jun. 6, 2014.

(51) Int. Cl.
*G06F 17/30* (2006.01)

(52) U.S. Cl.
CPC ...... *G06F 17/30091* (2013.01); *G06F 17/301* (2013.01); *G06F 17/30017* (2013.01); *G06F 17/30174* (2013.01); *G06F 17/30867* (2013.01)

(58) Field of Classification Search
CPC ......... G06F 17/30017; G06F 17/30867; G06F 17/30091; G06F 17/30174; G06F 17/301
USPC ....................................................... 707/802
See application file for complete search history.

(56) References Cited

U.S. PATENT DOCUMENTS

| | | | |
|---|---|---|---|
| 6,631,206 B1 * | 10/2003 | Cheng | G06T 5/002 358/515 |
| 8,176,277 B2 * | 5/2012 | Bricker | G06F 11/2097 711/162 |
| 8,655,110 B2 | 2/2014 | Fuchs et al. | |
| 8,850,487 B2 * | 9/2014 | Kang | H04N 21/47205 709/219 |
| 2008/0126191 A1 * | 5/2008 | Schiavi | G06Q 30/0258 705/14.56 |
| 2011/0016406 A1 | 1/2011 | Grosz et al. | |

(Continued)

OTHER PUBLICATIONS

Adobe, "Adobe Bridge", Help and Tutorials, dated Sep. 2013, 120 pages.

*Primary Examiner* — Phong H Nguyen
(74) *Attorney, Agent, or Firm* — Hickman Palermo Becker Bingham LLP; Adam C. Stone (57) ABSTRACT

An automation plugin to a digital asset editing program. In one embodiment, for example, a method performed by the automation plugin to the digital asset editing program executing on a computing device having at least one processor and memory comprises: allowing a user of the digital asset editing program to filter a library of digital assets by custom metadata associated with the digital assets; receiving custom metadata filtering criteria from the user; and responsive to determining one or more of the digital assets are associated with custom metadata satisfying the custom metadata filtering criteria, allowing the user to select at least one filtering result, corresponding to one of the one or more digital assets, which, when selected, causes the corresponding digital asset to at least be loaded into the digital asset editing program for editing by the user.

18 Claims, 5 Drawing Sheets

(56) References Cited

U.S. PATENT DOCUMENTS

| | | | |
|---|---|---|---|
| 2011/0238716 A1* | 9/2011 | Amir | G06F 3/0611 |
| | | | 707/823 |
| 2011/0238906 A1* | 9/2011 | Amir | G06F 3/0611 |
| | | | 711/111 |
| 2011/0307441 A1* | 12/2011 | Bricker | G06F 17/30212 |
| | | | 707/610 |
| 2012/0192064 A1 | 7/2012 | Antebi et al. | |
| 2013/0133013 A1* | 5/2013 | Kang | H04N 21/4828 |
| | | | 725/86 |
| 2014/0072285 A1* | 3/2014 | Shynar | G11B 27/031 |
| | | | 386/286 |

* cited by examiner

TECHNIQUES FOR PROCESSING DIGITAL ASSETS FOR EDITING IN A DIGITAL ASSET EDITING COMPUTER PROGRAM

PRIORITY CLAIM

This application claims the benefit of Provisional Appln. 62/009,001, filed Jun. 6, 2014, the entire contents of which is hereby incorporated by reference as if fully set forth herein, under 35 U.S.C. §119(e).

FIELD

The disclosed technologies relate generally to processing digital assets for editing in a digital asset editing computer program.

BACKGROUND

A digital asset editing computer program is computer program software or other computer-executable instructions for loading, editing, or otherwise processing digital assets. One non-limiting example of a digital asset editing program is the Adobe® Photoshop® computer program, available from Adobe Systems Incorporated of San Jose, Calif. Typically, a digital asset editing program provides a graphical user interface with which a user can command the editing program to load, edit, or otherwise process a digital asset. For brevity, a digital asset editing computer program is referred to hereinafter as just an "editing program".

A digital asset is information that can be loaded, edited, or otherwise processed by an editing program. Examples of digital assets include, but are not limited to, digital images, digital video, digital audio, digital documents, and other types of digital information. A digital asset typically conforms to a particular digital media type. One non-limiting example of a digital asset media type is the Adobe® Photoshop® Document format, also known as the .PSD format. For brevity, a digital asset is referred to hereinafter as just an "asset" and a digital asset media type is referred to hereinafter as just a "media type".

It can difficult, tedious, and time consuming for a user to accomplish certain tasks with some editing programs. For example, to load an asset for editing in an editing program, the user typically uses a file browser application to browse through a file system file-folder hierarchy to locate the file containing the asset of interest. To find the file quickly using the file browser application, the user must remember the location in the file system file-folder hierarchy where the file is stored. Even if the user does remember the exact location, using a file browser application to locate the file can still be tedious, requiring the user to navigate through multiple levels of the file-folder hierarchy to finally arrive at the file.

The file browser application-based loading process can be even more frustrating, for example, if the user does not know or remember where in the file system the file is stored. In this situation, the user may guess at different possible storage locations and use the file browser application to navigate to each guessed location individually until the file is found. This can be frustrating to the user, for example, if the user navigates to multiple file system locations before finding the file or even overwhelming, for example, if there is a large number of files and folder the user must consider.

Further, it is often the case, that in order to find the right file using a file browser application, the user is required to recognize the file of interest by its file system file name. If the user does not know or recall the file name, then the user may resort to loading assets from different files until the asset of interest is loaded. Overall, current approaches for loading an asset for editing in an editing program are inefficient.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for processing an asset for editing in an editing program. As shall be described in greater detail hereafter, the techniques involve use of an automation plugin to the editing program that allows a user of the editing program to filter a library of assets by custom metadata associated with the assets. The custom metadata can be any metadata associated with the assets used by the automation plugin for filtering, loading, editing, or otherwise processing the assets. In some implementations, the custom metadata is character string-based metadata that is embedded (stored) in the assets in way that does not integrity of the media type(s) of the assets.

In addition to filtering assets by custom metadata, the techniques include augmenting the graphical user interface (GUI) of the editing program to obtain custom metadata filtering criteria from the user. In some implementations, the filtering criteria is a Boolean expression formed of one or more character strings, optionally related by one or more Boolean operators. The automation plugin applies the filtering criteria to the custom metadata associated with the assets to identify any assets in the library that satisfy the filtering criteria. An asset in the library that satisfies particular filtering criteria is referred to hereinafter as a "filtered" asset with respect to the particular filtering criteria. The techniques further include presenting the results of filtering in the augmented GUI. Filtering results corresponding to filtered assets are selectable in the augmented GUI by the user to load a selected asset into the editing program for editing by the user. A user can use techniques described herein to load an asset for editing in lieu of using a file system file browser application to load the asset.

According to some of the techniques, when a filtering result corresponding to a filtered asset is selected in the augmented user interface, the automation plugin automatically edits the asset, based on the custom metadata associated with the asset, in preparation for further editing by the user in the editing program. For example, the associated custom metadata may indicate a particular position for the asset on an editing canvas of the editing program. For example, the particular position may be at the top border of the editing canvas and horizontally centered on the canvas. When the user selects the filtering result corresponding to the filtered asset, the automation plugin, possibly in addition to loading the asset for editing in the editing program, processes the custom metadata to automatically position the asset at the particular position on the editing canvas. In this way, the user is relieved from having to manually position the asset on the canvas at the particular position using available controls of the editing program, which the user may find difficult or tedious to use. This is just one example of the automatic edits that can be made by the automation plugin based on custom metadata to prepare an asset for further editing by a user.

Editing Program with Automation Plugin

Figure 1:
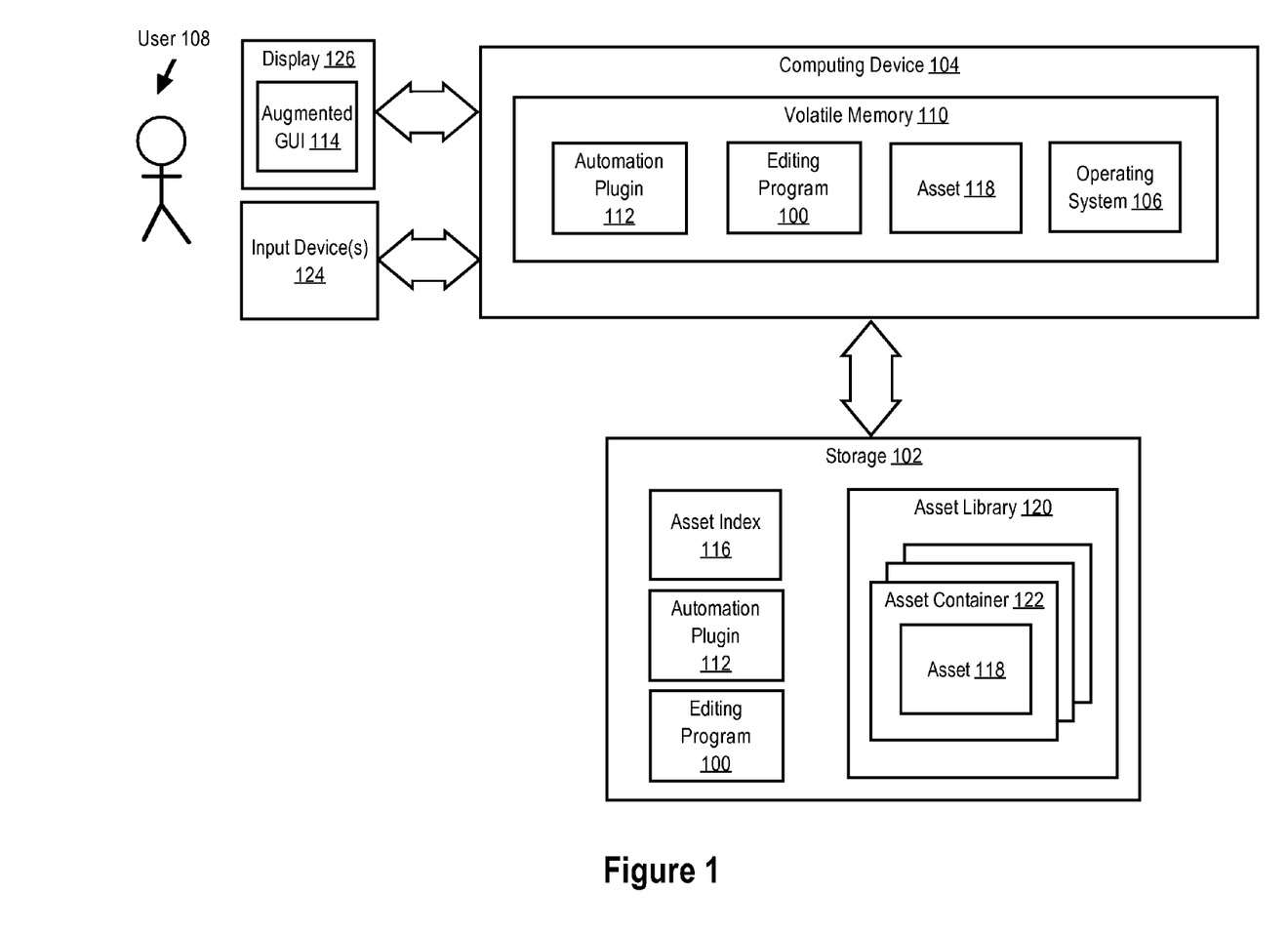
FIG. 1 is a block diagram of an editing program with an automation plugin, according to an embodiment of the present invention.

Techniques of the present invention for processing an asset for editing in an editing program are implemented by an automation plugin to the editing program. Without the automation plugin of the present invention, the editing program may provide "out-of-the-box" functionality to a user of the editing program for locating, loading, editing, or otherwise processing assets. For example, without the automation plugin, the editing program may provide a file browser application for locating and loading assets for editing in the editing program. In addition, without the automation plugin, the editing program may provide GUI controls for editing a loaded assets in various ways. With the automation plugin, the editing program is configured to provide "enhanced" functionality for locating, loading, editing, or otherwise processing assets. With the automation plugin, the editing program may be configured to provide the enhanced functionality in addition to or instead of the out-of-the-box functionality. The user may find the enhanced functionality provided by the automation plugin easier to use or otherwise increase the user's productivity in using the editing program, relative to the out-of-the-box functionality. FIG. 1 is a block diagram of an editing program with an automation plugin that implements techniques of the present invention for processing an asset for editing in an editing program.

Referring to FIG. 1, an editing program 100 (or one or more sets of computer-executable instructions) is stored on a storage device 102. A computing device 104 executes an operating system 106. Operating system 106, which has access to storage device 102, loads editing program 100 for execution by computing device 104, for example, in response a command from a user 108. Volatile memory 110, which includes any virtual memory implemented by operating system 106, stores operating system 106 and editing program 100 while editing program 100 is executing.

An automation plugin (or one or more sets of computer-executable instructions) 112 is also stored on storage device 102. Automation plugin 112 is also loaded into memory 110 for execution on computing device 104. Automation plugin 112 may be automatically loaded for execution by editing program 100, possibly with the aid of operating system 106. For example, editing program 100 may be pre-configured to automatically load automation plugin 112 for execution. Alternatively, editing program 100 may load automation plugin 112 for execution in response to a command from user 108. As yet another alternative, operating system 106 may load automation plugin 112 for execution on computing device 104, for example, in response to a command from user 108.

While executing, automation plugin 112 drives an augmented GUI 114 which combines GUI elements driven by automation plugin 112 and GUI elements driven by editing program 100, possibly with the aid of operating system 106. The GUI elements driven by automation plugin 112 include a filtering GUI for receiving filtering criteria from user 108. The filtering GUI is also used to display the results of filtering to user 108 and for allowing user 108 to select a filtered asset to load for editing in editing program 100. An example filtering GUI that may be driven by automation plugin 112 is provided hereinafter.

While executing, automation plugin 112 receives filtering criteria from user 108. Responsive to receiving the filtering criteria, automation plugin 112 consults an index 116 to identify assets 118 in asset library 120 associated in the index 116 with custom metadata that satisfies the filtering criteria.

Automation plugin 112 presents results of filtering to user 108 in augmented GUI 114. Presented filtering results correspond to assets 118 in library 120 that satisfy the filtering criteria. In other words, presented filtering results correspond to filtered assets 118 in library 120 that are associated in index 116 with custom metadata that satisfies the filtering criteria.

Upon selection of a presented filtering result by user 108, automation plugin 112 loads the selected asset for editing in editing program 100. Optionally, upon or after loading the selected asset, automation plugin 112 can additionally edit or otherwise process the selected asset for further editing by user 108 in editing program 100.

Editing program 100 is computer program software or other computer-executable instructions for loading, editing, or otherwise processing assets 118. Editing program 100 may offer or provide an application programming interface (API) to automation plugin 112 for automatically performing certain functions. For example, the API may allow the automation plugin 112 to automatically load a particular asset 118 for editing in editing program 100 by specifying the asset container 122 of the particular asset. The API may also allow automation plugin 112 to automatically edit a loaded asset 118 in a way that is particular to the type of editing program 100 and the type of asset 118. However, the techniques or the automation plugin of the present invention is not limited to any particular type of editing program 100 or any particular type of asset 118.

In one example embodiment, editing program 100 is the Adobe® Photoshop® graphics and image editing computer program, available from Adobe Systems Incorporated of San Jose, Calif. and assets 118 are Adobe® Photoshop® documents contained in .PSD files. However, editing program 100 can be another type of editing program such as word processing program, a spreadsheet program, a video editing program, a music editing program, or other editing program for editing assets 118. Accordingly, assets 118 can be another media type such as word processing document, a spreadsheet document, a video editing document, a music editing document, or other document or information editable by editing program 100.

Storage device 102 includes non-volatile data storage media. A non-volatile data storage media can be a hard disk, flash memory, ferroelectric random access memory (F-RAM), or other data storage media that retains information when not powered.

Although represented with a single box in the block diagram of FIG. 1, storage device 102 may actually be many storage devices, some or all of which may be part of computing device 104, or some or all of which may be accessible to computing device 104 over a data network (e.g., a LAN, WAN, or the Internet). Accordingly, any one or a combination of index 116, automation plugin 112, editing program 100, or asset library 120 may be stored on one or more storage devices 102 of computing device 104 and/or one or more storage devices 102 accessible to computing device 104 on a data network.

Computing device 104 may be any computer system compatible with the techniques disclosed herein. An example computer system on which the techniques of the present invention may be implemented is described hereinafter with respect to FIG. 5. Non-limiting examples of computing device 104 include a personal computer, a desktop computer, a workstation computer, a laptop computer, a tablet computer, and a mobile/smart phone.

Operating system 106 includes a conventional operating system or any other operating system that is not incompatible with the techniques described herein. Operating system 106 may offer or provide a system call interface to editing program 100 and automation plugin 112 for performing certain execution tasks such as, for example, driving augmented GUI 114, writing and reading data to and from storage device 102, and receiving user input by way of input device(s) 124.

In this description, various actions are described as being performed by an automation plugin, like automation plugin 112. Such actions may be accomplished with the aid of an editing program, such as editing program 100, and/or an operating system, such as operating system 106. In particular, the automation plugin may accomplish certain actions by invoking (calling) an API of the editing program and/or the system call interface of the operating system. Thus, any action described herein as being performed by the automation plugin may in fact be performed entirely by the automation plugin, or may be performed in part by the editing program and/or the operating system.

User 108 is a human user of computing device 104. For example, user 108 may employee, artist, student, or other user trained or otherwise knowledgeable in using editing program 100 to edit assets 118.

Volatile memory 110 (e.g., random-access memory (RAM)) includes any primary, main, or internal computer memory accessible by the central processing unit(s) CPUs over a memory bus of computing device 104.

Augmented GUI 114 is displayed on video display device 102 and driven by automation plugin 112 and editing program 110. Augmented GUI 114 includes one more GUI elements such as windows, dialogs, buttons, scrollbars, menus, etc. One of the GUI elements is the filtering GUI element driven by automation plugin 112 and of which an example is provided hereinafter.

Index 116 is information that associates custom metadata with assets 118 in asset library 120 in a way that allows automation plugin 112 to quickly identify assets 118 in library 120 that satisfy filtering criteria received from user 108. For example, index 116 may be structured as an inverted index or other type of index structure suitable for associating custom metadata with assets 118 where the custom metadata are the "keys" in the index structure and where the assets 118, or information identifying the assets 118, are part of the "values" in the index structure.

Generally, the custom metadata associated with an asset 118 in index 116 is a set of one or more character string values. A character string value can be any arbitrary sequence of characters. A character string value associated with an asset 118 in index 116 may also be "tagged" in index 116 with a "tag". A tag may also be a character string value. Thus, custom metadata associated with an asset 118 in index 116 may be viewed as a set of one or more tag-value pairs. However, not all custom metadata values need be tagged in index 116. Thus, custom metadata associated with an asset 118 in index 116 may be viewed as a set of one or more tag-value pairs where some of the tag-value pairs have an empty valued or NULL valued tag.

In some embodiments, index 116 associates custom metadata with an asset 118 in library 120 by an identifier of an asset container 122 that contains the asset 118. Typically, the asset container 122 is a file system file or a file system folder. Accordingly, the identifier of the asset container 122 associated with custom metadata in index 116 will typically be a file system file name or a file system folder name or other file system path identifier. However, other types of identifiers are possible. For example, an identifier of an asset container 122 could be a Uniform Resource Locator (URL) or other network resource identifier.

An asset 118 is information that can be loaded, edited, or otherwise processed by editing program 110. Examples of assets 118 include, but are not limited to, digital images, digital video, digital audio, digital documents, and other types of digital information. An asset 118 typically conforms to a particular media type. One non-limiting example of a media type is the Adobe® Photoshop® Document format, also known as the .PSD format. However, the present invention is not limited to any particular type of asset 118 or any particular media type for an asset 118. Any asset 118 in any media type supported by editing program 100 may be used.

In some embodiments, asset 118 contains (embeds) custom metadata. The custom metadata is embedded in the asset 118 in a way that does not destroy the integrity of the media type of the asset 118. In other words, editing program 100 can still process (e.g., load or edit) the asset 118 according to the media type of the asset 118 even though the asset 118 contains (embeds) custom metadata. For example, if the asset is of the .PSD media type format and the editing program is Adobe® Photoshop®, the Adobe® Photoshop® editing program the can still process the .PSD asset normally even though is contains (embeds) custom metadata. In some embodiments, custom metadata is embedded in a .PSD asset in a special or hidden Adobe® Photoshop® layer. More generally, custom metadata may be embedded in an asset 118 in any way that is compatible with the media type of the asset 118. Such compatibility may be defined, for example, by an official or standard specification of requirements for conforming to the media type such that if an asset meets the requirements, the asset is considered to be of the media type.

Asset library 120 is a collection of one or more asset containers 120. Each asset container 122 may contain one or more assets 118. Asset library 120 may correspond to a file system folder or a set of file system folders, for example. In an exemplary embodiment, asset library 120 contains hundreds or thousands of assets 118. Asset library 102 may contain other types of containers. For example, asset library 120 may contain file system files and folder containing information other than assets 118. Thus, asset library 120 may comingle assets 118 with other types of information.

Asset containers 122 in library 120 contain assets 118. An asset container 122 may contain more than one asset 118 or just one asset 118. An asset container 122 may also contain information other than assets. An asset container 122 may be a file system file or file system folder or a network resource, for example.

Input device(s) 124 are devices used by user 108 to command computing device 104. Input device(s) 124 can include a keyboard, a pointing device (e.g., a mouse), a touch sensitive surface (e.g., a touch screen), a voice input device, a camera, or other user input device.

Display 126 includes a standard computer video display device which may be integrated into the form factor of computing device 104 or a separate device. Display 126 may also be an input device 102, for example, if display 126 is a touch-screen or touch-sensitive display.

Filtering Criteria

According to some embodiments of the present invention, an automation plugin to an editing program, such as automation plugin 112 of editing program 100, obtains filtering criteria from a user of a computing device, such as user 108 of computing device 104. The automation plugin uses the filtering criteria to identify assets associated with custom metadata satisfying the filtering criteria.

To determine assets associated with custom metadata satisfying the filtering criteria, the automation plugin consults an index, such as index 116, associating assets with custom metadata. The automation plugin consults the index using the filtering criteria as a key into the index. The automation plugin presents filtering results to the user corresponding to assets identified in the index associated with custom metadata satisfying the filtering criteria.

The filtering criteria is any information used by the automation plugin to identify assets in the index associated with custom metadata satisfying the information. In some implementations of the present invention, the filtering criteria is a Boolean expression comprising one or more character-string tokens, and optionally one or more Boolean operators relating tokens within the expression. Each token is a single word or a single sequence of non-whitespace characters. For example, the character sequences "andr" and "android" are both tokens. The Boolean operators include conjunction (i.e., AND), disjunction (i.e., OR), and negation (i.e., NOT) operators. A Boolean operator is expressed in filtering criteria as a character string representing the operator such as, for example, "AND", "and", "OR", "or", "NOT", or "not". For example, the filtering criteria expressions "android blue" and "android and blue" are each satisfied by custom metadata associated with an asset containing both the string values "android" and "blue". As another example, the filtering criteria expression "android OR blue" is satisfied by custom metadata associated with an asset containing either the string value "android" or the string value "blue". As yet another example, the filing criteria expression "android not blue" is satisfied by custom metadata associated with an asset containing the string value "android" but not containing the string value "blue".

Satisfaction of filtering criteria by custom metadata in the index can be case-sensitive or case-insensitive. If case-sensitive, a custom metadata value matches a filtering criteria token if the value and the token contain the same sequence of characters all in matching case. For example, the value "aNDroid" is a case-sensitive match with the value "aNDroid" but not a case-sensitive match with the value "android". If case-insensitive, a custom metadata value matches a filtering criteria token if the value and the token contain the same sequence of characters regardless of the case of the characters. For example, the value "aNDroid" is a case-insensitive match with the value "aNDroid" and a case-insensitive match with the value "android". In an exemplary embodiment, the automation plugin performs case-insensitive matching between filtering criteria tokens and custom metadata values.

The automation plugin can obtain filtering criteria from the user in a variety of different ways and the automation plugin is not limited to obtaining the filtering criteria from the user in any particular way. Generally, the automation plugin obtains filtering criteria, or information identifying filtering criteria, from the user by way of an input device, such as one of input device(s) 124. For example, the automation plugin may obtain filtering criteria in response to the user entering characters using a physical (hard) or soft keyboard.

In one scenario, the automation plugin obtains filtering criteria from the user in response to the user interacting with an interactive GUI element such as one presented, for example, as part of augmented GUI 114. For example, the automation plugin can obtain filtering criteria in response to the user selecting an icon, button, image, hyperlink, or other interactive GUI element. The GUI element may represent filtering criteria associated with the GUI element that the automation plugin obtains in response to the user interacting with the GUI element. For example, the filtering criteria "ios" may be associated with a GUI element representing the APPLE IOS operating system such that when the user interacts with the GUI element the automation plugin obtains the filtering criteria "ios".

The automation plugin may obtain filtering criteria at different times. For example, the automation plugin may obtain first filtering criteria at a first time, for example, in response to the user entering characters or words using a keyboard. The automation plugin may then obtain second filtering criteria at a second time, which may be earlier or later than the first time, for example, in response to the user selecting an interactive GUI element associated with filtering criteria.

The automation plugin can consult the index with different filtering criteria at different times. For example, the automation plugin can consult the index a first time with first filtering criteria to identify a first set of assets associated with custom metadata satisfying the first filtering criteria. The automation plugin can consult the index at a second different time with second filtering criteria to identify a second set of assets associated with custom metadata satisfying the second filtering criteria.

The automation plugin can consult the index a first time with the earlier of received first and second filtering criteria and then later, at a second time, with a combination of the first and second filtering criteria. For example, the automation plugin can consult the index at a first time to identify a first set of assets associated with custom metadata satisfying first filtering criteria "blue" obtained in response to user entering "blue" using a keyboard. Then, the automation plugin can consult the index later, at a second time, to identify a second set of assets associated with custom metadata satisfying second filtering criteria "blue android" in response to the user selecting an interactive GUI element associated with the filtering criteria "android". In this example, the automation plugin, in response to the user selecting the interactive GUI element, combines the filtering criteria "blue", previously obtained in response to the user entering "blue" using the keyboard, with the filtering criteria "android", obtained in response to the user selecting the interactive GUI element, to form the filtering criteria "blue android". In this case, if the filtering criteria "blue android" is treated as a conjunctive Boolean expression by the automation plugin, the second set of assets may be subset of the first set of assets consisting of all assets in the library associated with both "blue" and "android" custom metadata values.

Descriptive and Editing Custom Metadata

In some embodiments, an asset is associated in the index with two types of custom metadata. A first type is referred to herein as "descriptive" custom metadata. A second type is referred to herein as "editing" custom metadata. The automation plugin filters assets based on descriptive custom metadata and automatically edits assets based on editing custom metadata. Depending on how custom metadata associated with an asset is used by the automation plugin, the associated custom metadata can also be both descriptive and editing, or just descriptive, or just editing.

Descriptive custom metadata describes various characteristics of an asset that may be meaningful to the user using the automation plugin to filter assets. Some non-limiting examples of the various characteristic descriptive custom metadata associated with an asset can describe include:
  A name for the asset.
  A date or time the asset was created or last modified.
  A type, genre, group, class, or category of the asset.
  An author, creator, or modifier of the asset.
  An operating system the asset is designed for or compatible with. For example, an asset may be associated with the descriptive custom metadata value "android" to indicate the asset is to designed for or compatible with the ANDROID operating system.
  A type of computer application the asset is designed for or compatible with. For example, an asset may be associated with the descriptive custom metadata value "mobile" to indicate the asset is designed for or compatible with mobile applications, or "web" to indicate the asset is designated for or compatible with web applications.

Editing custom metadata, which can at the same time be descriptive custom metadata, indicates how an asset should be automatically edited by the automation plugin in the context of the automation plugin commanding the editing program to load the asset or after the editing program has loaded the asset. The present invention is not limited to any particular manner of automatically editing an asset and the automatic editing performed may vary depending on the type of asset or the type of editing program. For example, an image-based asset may undergo automatic image processing, while an audio-based asset may undergo automatic audio processing. Some non-limiting examples of types of automatic edits that can be indicated by editing custom metadata include:
  Editing canvas position—If the asset is a visual asset such as, for example, an image or graphic, editing custom metadata associated with the visual asset may indicate where on an editing canvas the visual asset should be positioned. For example, the visual asset may be associated with the editing custom metadata values "top" and "center" to indicate the visual asset is to be automatically edited so that it is positioned on the editing canvas at the top border of the canvas and centered along the top border. In addition or alternatively, the visual asset may be associated with editing custom metadata values indicating, for example, an X-Y coordinate position for the visual asset on the editing canvas.
  Processing—Editing custom metadata associated with an asset may indicate automatic processing to be performed on the asset. For example, if the asset is a visual asset such as, for example, an image or a graphic, the editing custom metadata may indicate image cropping, flipping, or rotating processing to be performed, or image filtering to be performed (e.g., blurring/smoothing, sharpening, or denoising to be performed).

Custom Metadata Value Tags

According to some embodiments of the present invention, custom metadata associated with an asset in an index, such as index 116, contains one or more "tagged" custom metadata values. The custom metadata values can be, for example, descriptive and/or editing custom metadata values as described above. A custom metadata value in the index can also be "tagged" to form a tag-value pair. A tag can be used to indicate a type or value domain for the associated custom metadata value. For example, a custom metadata value of "android" may be associated with the tag "os" indicating the value refers to the ANDROID operating system. As another example, the custom metadata value "top-centered" associated with an asset may further be associated with the tag "position" indicating the value refers to a position for the asset on an editing canvas.

While in some instances, a custom metadata value is associated in the index with a tag, other custom metadata values in the index are not associated with any tags in other instances. Further, a custom metadata value in the index may be associated with multiple tags. Further still, a tag in the index may be associated with just one custom metadata value or multiple custom metadata values.

In some instances, tags associated with custom metadata values in the index are used by the automation plugin to scope filtering criteria obtained from the user. For example, the automation plugin can scope filtering criteria using tags when the filtering criteria is used by the automation plugin to consult the index for identifying assets associated with custom metadata satisfying the filtering criteria. Scoping filtering criteria using a tag includes comparing a designated token or tokens in the filtering criteria to only custom metadata values in the index having a certain tag. For example, the augmented GUI, such as augmented GUI 114, may present an interactive GUI element associated with the designated token "ios", referring to the APPLE IOS operating system. When the user interacts with the interactive GUI element, the automation plugin can compare the designated token "ios" to custom metadata values in the index associated with the tag "os". Such comparison may be performed, for example, to identify assets in the library configured for or compatible with the APPLE IOS operating system.

Filtering Results

According to some embodiments of the present invention, assets the automation plugin identifies in an index, such as index 116, as associated with custom metadata satisfying filtering criteria are presented to the user in an augmented user interface, such as augmented user interface 114, as filtering results.

A filtering result is information displayed in the augmented user interface representing a filtered asset (i.e. an asset satisfying particular filtering criteria). A filtering result can be interactive such that when a user interacts with the filtering result an operation is performed by the automation plugin. For example, the automation plugin can load the filtered asset for editing in the editing program. In addition, the automation plugin can automatically edit the filtered asset based on editing custom metadata associated with the filtered asset in anticipation for further editing of the asset by the user.

The information presented to the user in the augmented user interface by a filtering result can be any information that indicates the corresponding filtered asset. For example, a filtering result can present some of the descriptive and/or editing custom metadata associated with the corresponding filtered asset in the index. In some instances in which the corresponding filtered asset is a visual media type such as, for example, a digital image, a .PSD document, a digital movie, or a graphic, the filtering result presents a thumbnail image of filtered asset. In this way, the user can see the filtered asset before leading it for editing in the editing program. A filtering result may present the corresponding filtered asset in other ways for other media types. For example, if the corresponding filtered asset is a digital audio media type, the filtering result may allow the user to interact (e.g., with a mouse over, touch, or click) with the filtering result to hear a presentation of a portion or all of the corresponding filtered asset. In this way, the user can listen to the corresponding filtered asset before loading it for editing in the editing program.

Filtering GUI

In addition to a GUI driven by the editing program, the automation plugin may drive a filtering GUI that augments the GUI driven by the editing program to form an augmented GUI. A user of filtering GUI may use the filtering GUI to provide filtering criteria to the automation plugin and to view and select filtering results.

According to one embodiment, the filtering GUI presents the user an interface through the administrator may specify (a) a filtering criteria expression and/or (b) one or more filtering criteria tokens. Such an interface is illustrated, for example, in FIG. 2.

Figure 2:
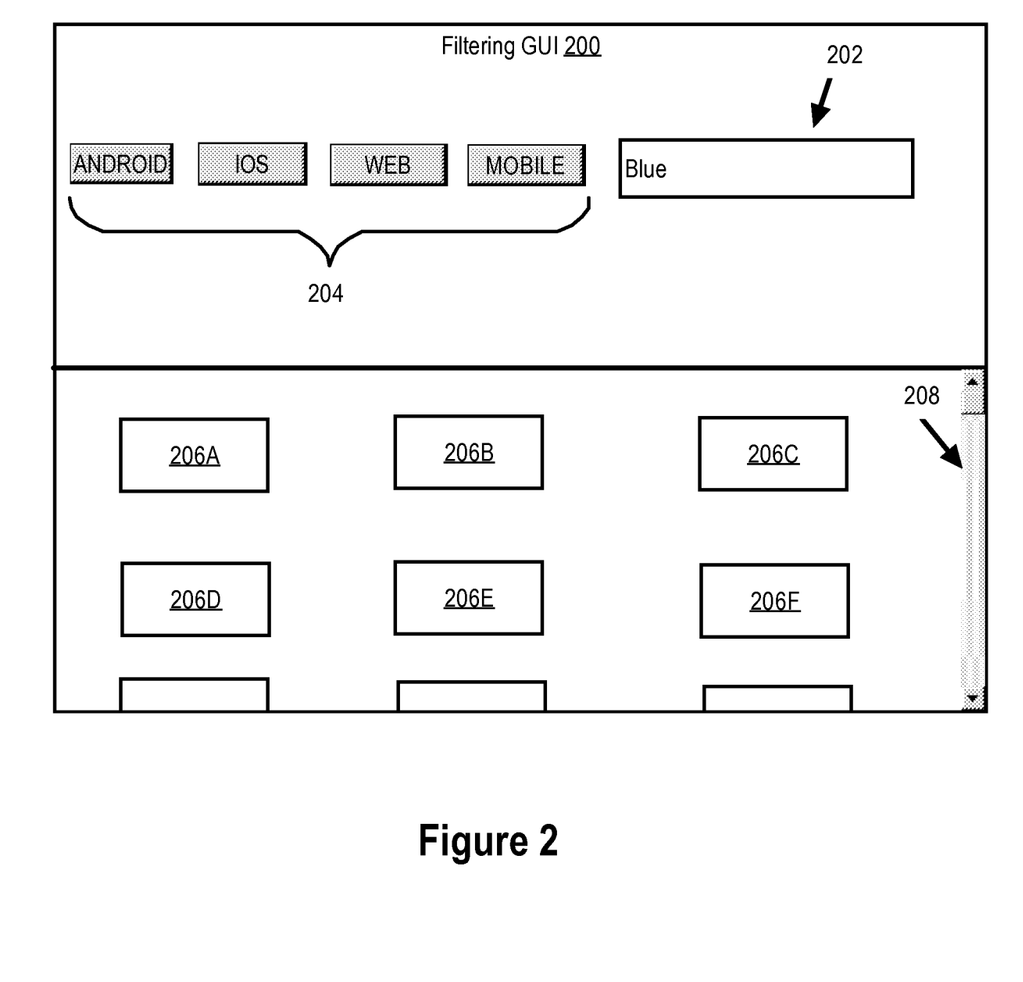
FIG. 2 is a block diagram that illustrates a filtering interface, according to an embodiment.

Referring to FIG. 2, it illustrates a filtering GUI 200. The filtering GUI may be, for example, a window or dialog provided by the automation plugin. In the illustrated embodiment, the filtering GUI includes one control 202 through which the user may specify a filtering criteria expression, and one or more second controls 204 through which the user may specify one or more filtering criteria tokens. In this example, there are four second controls 204. However, there can be less or more than four second controls 204 and the filtering GUI is not limited to a certain number of second controls 204.

The filtering criteria expression specifying through control 202 may be a Boolean expression comprising one or more character-string tokens, optionally related by one or more Boolean operators. In this example, the user has specified the character-string token "blue" through control 202.

Each of second controls 204 is associated with a character-string token. The user can select one or more of the second controls 204 to specify the associated token as filtering criteria.

In accordance with some embodiments, when consulting an index, such as index 116, to identify assets that satisfy user-specified filtering criteria, the automation plugin combines (a) the current filtering criteria expression the user has specified through control 202 and (b) one or more tokens corresponding to currently selected controls 204. The automation plugin then consults the index with the combination. For example, if the current filtering criteria expression specified through control 202 is "blue" and the "IOS" control 204 and the "MOBILE" control 204 are currently selected, then the automation plugin consults the index with the current filtering criteria "blue IOS MOBILE", or the logical Boolean expression "blue" AND "IOS" AND "MOBILE".

In accordance with some embodiments, the automation plugin consults the index with current filtering criteria (a) when a new token is specified through first control 202 and (b) when one of the second controls 204 is selected or unselected. For example, assume the user specifies the characters "B", then "1", then "u", and then "e" through the first control 202, then selects the "IOS" second control 204, then selects the "MOBILE" second control 204, and then unselects the "IOS" second control 204. The automation plugin would consult the index at each of the following times with the following corresponding current filtering criteria:

| Time | User Input | Current Filtering Criteria (Boolean expression) |
|---|---|---|
| t0 | Specify "B" through first control 202 | "B" |
| t1 > t0 | Specify "Bl" through first control 202 | "Bl" |
| t2 > t1 | Specify "Blu" through first control 202 | "Blu" |
| t3 > t2 | Specify "Blue" through first control 202 | "Blue" |
| t4 > t3 | Select "IOS" second control 204 | "Blue" AND "IOS" |
| t5 > t4 | Select "MOBILE" second control 204 | "Blue" AND "IOS" AND "MOBILE" |
| t6 > t5 | Unselect "IOS" second control 204 | "Blue" AND "MOBILE" |

Each time the automation plugin consults the index with filtering criteria, the automation plugin updates filtering GUI 200 with filtering results 206 representing assets that satisfy the current filtering criteria. For example, the automation plugin may update filtering GUI 200 at each of the seven times listed in the above-table. For example, at time t4, the filtering results displayed in the filtering GUI 200 would correspond to assets associated with custom metadata satisfying the then current filtering criteria "Blue" AND "IOS".

Filtering GUI 200 may also provide a scrollbar or other scroll control for viewing current filtering results that are not currently displayed in filtering GUI 200 because of the display screen size constraints or current constraints on the size of the filtering GUI 200.

Automatically Updating the Asset Index in a Synchronization Environment

In some embodiments, asset containers (and the assets contained therein) in the asset library, such as asset library 120, and the asset index, such as asset index 116, are synchronized across multiple computing devices through a content item management service. One non-limiting example of a suitable content item management service for synchronizing the asset containers and the index across the multiple computing devices is the Dropbox service provided Dropbox, Inc. of San Francisco, Calif. In addition, the automation plugin on one of the multiple computing devices detects changes to custom metadata embedded in the synchronized assets. When a change to custom metadata embedded in a synchronized asset is detected, the automation plugin updates the index to associate the updated custom metadata with the asset in the index. The updated index is then synchronized to the other computing devices through the content item management service. In this way, the index is automatically updated and the updated index is thereafter automatically made available for filtering at each of the multiple computing devices. An example synchronization environment in which automatic updating and synchronization of the index can occur is illustrated in FIG. 3.

Figure 3:
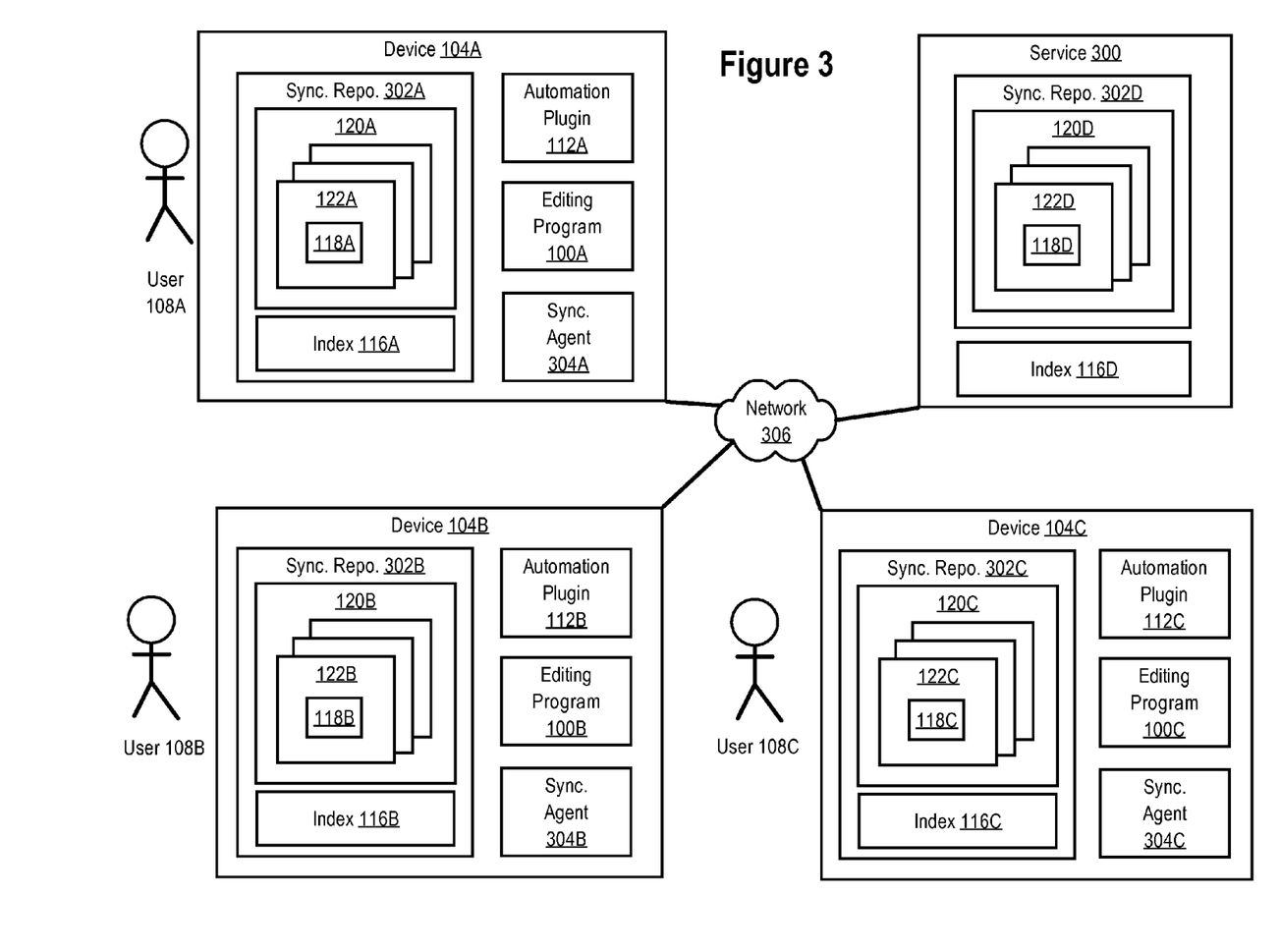
FIG. 3 is a block diagram that illustrates a synchronization environment in which an asset index can be automation updated, according to an embodiment.

FIG. 3 is a block diagram of networked synchronization environment in which automatic updating and synchronization of the index may occur, according to an embodiment. As shown, three computing devices 104A, 104B, and 104C are connected to an online content item management service 300 via a data network 306 such as, for example, the Internet. Computing devices 104A, 104B, and 104C are used by users 108A, 108B, and 108C, respectively. Users 108A, 108B, and 108C may have user accounts with service 300 in order for service 300 to provide content item synchronization services to users 108A, 108B, and 108C at their computing devices 104A, 104B, and 104C. Other embodiments may have different numbers of computing devices and users and the present invention is not limited to any particular number of computing devices or users.

Each of computing devices 104A, 104B, and 104C is configured with a synchronization agent (or one or more sets of computer-executable instructions) 304. Each synchronization agent 304 on a device 104 is configured, when executing on the device 104, to periodically synchronize a local synchronization repository 302 on the device 104 with a remote synchronization repository 302D hosted by service 300. In particular, synchronization agent 304A is configured to periodically synchronize content items stored in local synchronization repository 302A, including asset containers 112A and index 116A, with content items stored in remote synchronization repository 302D, including asset containers 112D and index 116D. Synchronization agent 304B is configured to periodically synchronize content items stored in local synchronization repository 302B, including asset containers 112B and index 116B, with content items stored in remote synchronization repository 302D, including asset containers 112D and index 116D. Synchronization agent 304C is configured to periodically synchronize content items stored in local synchronization repository 302C, including asset containers 112C and index 116C, with content items stored in remote synchronization repository 302D including asset containers 112D and index 116D.

The synchronization agent 304 may periodically synchronize content items in response to detecting changes to content items in the "local" synchronization repository 302 or in response to being notified by service 300 that new changes are available in synchronization repository 302D. In addition or alternatively, the synchronization agent 304 may periodically synchronize on a time interval such as, for example, every 15 minutes. Here, the "local" synchronization repository 302 refers to the synchronization repository 302 at the same device 104 on which the synchronization agent 304 is executing. For example, synchronization repository 302A is the local synchronization repository for synchronization agent instance 304A.

The synchronization repositories 302A, 302B, and 302C on devices 104A, 104B, and 104C may correspond to a local file system folder such as, for example, a file system folder provided by an operating system such as, for example, operating system 106.

Synchronization repository 302D hosted by service 300 may, but may not, correspond to an operating system file system folder. For example, synchronization repository 302D may instead correspond to a set of individually addressable data blocks or storage units, perhaps stored across multiple computing devices.

Each of computing devices 104A, 104B, and 104C also executes an instance of automation plugin 112 and editing program 100. In particular, computing device 104A executes automation plugin instance 112A and editing program instance 100A, computing device 104B executes automation plugin instance 112B and editing program instance 100B, and computing device 104C executes automation plugin instance 112C and editing program instance 100C.

One of the executing automation plugin instances 112A, 112B, or 112C can be designated to detect changes to custom metadata embedded in assets 118 stored in the local synchronization repository 302 and to update the local index 116 with the detected changes. Hereinafter, this so designated automation plugin instance 112 is referred to as the "master" automation plugin instance and the other automation plugin instances 112 are referred to as "slave" automation plugin instances.

One of the automation plugin instances 112A, 112B, and 112C may be elected as the master. Such election can occur according to a network election protocol or scheme involving network 306. Alternatively, such election can occur manually by one of the users 108A, 108B, and 108C, for example. However, the present invention is not limited to any particular method of electing the master and the master may be elected in any suitable manner. For example, the master may simply be elected by agreement between the users 108A, 108B, and 108C. For example, users 108A, 108B, and 108C may agree that synchronization agent 304B executing on device 104B is to be the master. In this case, user 108B may configure synchronization agent 304B to detect changes to custom metadata embedded in assets 118B stored in the local synchronization repository 302B and to update the local index 116B with the detected changes, Such configuration can be made, for example, through a GUI driven by automation plugin 112B or through changes to configuration data used by automation plugin 112B for configuring the operation of automation plugin 112B.

According to some embodiments, changes to custom metadata embedded in assets 118 stored in the local synchronization repository 302 are detected by the master automation plugin instance 112 through an application programming interface (API) offered by the local synchronization agent 304. In particular, the API provides a notification mechanism to the master automation plugin instance 112 when the local synchronization agent 304 detects a change to a local asset container 112 in the location synchronization repository 302. The change to the local asset container 112 that is detected by the local synchronization agent 304 can occur for a variety of reasons. For example, the local asset container 112 may have changed because a user 108 edited the local asset container 112, for example, to add, remove, or change custom metadata embedded in an asset 118 contained in the local asset container 112. As another example, the local asset container 112 may have changed because a recent periodic synchronization between the local synchronization repository 302 and the remote synchronization repository 302D hosted by service 300.

In response to detecting the change to a local asset container 122 in the local synchronization repository 302, the local synchronization agent 304 notifies the master automation plugin instance 112 via the API. For example, the local synchronization agent 304 may message the master automation plugin 112 via an inter-process communication mechanism or a callback function. Such message may indicate or specify the local asset container 122 that was changed, for example, by an identifier of the local asset container 122.

In response to receiving notification of a changed local asset container 122, the master automation plugin 112 reads the changed local asset container 122 using the identifier of the changed local asset container 122 provided in the notification. In particular, the master automation plugin 112 reads any custom metadata embed in an asset 118 contained in the changed local asset container 112 and stores the read custom metadata in the local index 116 in association with the asset 118, or an identified of the asset 118. The changes to the local index 116 are then synchronized by the local synchronization agent 304 to the remote index 116D stored in remote synchronization repository 302D. From there, the changes to the local index are further synchronized to the index 116 local to the slave automation plugin instances 112. In this way, the index is automatically updated and the updated index is thereafter automatically made available for filtering at each of the multiple computing devices.

Sample Operation

The following description presents method steps that may be implemented using processor-executable instructions, for directing operation of a device under processor control. The processor-executable instructions may be stored on a non-transitory computer-readable medium, such as CD, DVD, hard disk, flash memory, or the like. The processor-executable instructions may also be stored as a set of downloadable processor-executable instructions, for example, for downloading and installation from an Internet location (e.g., a Web site).

Figure 4:
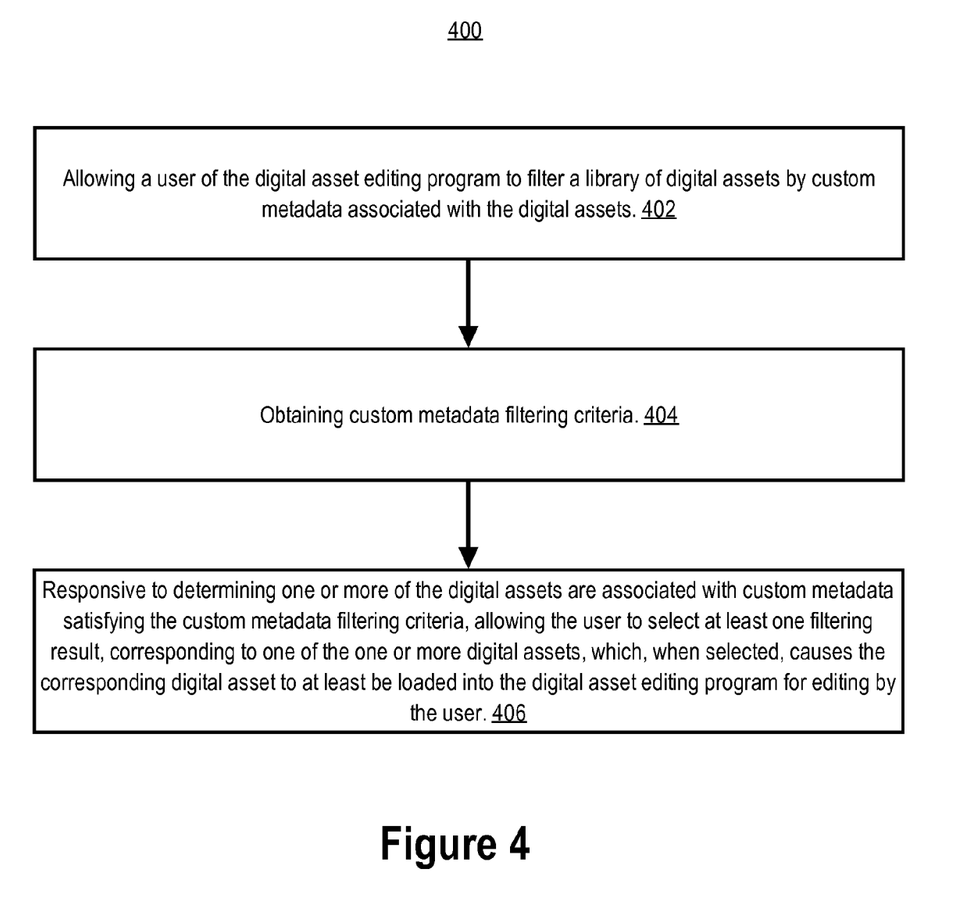
FIG. 4 is a flowchart illustrating steps performed by an automation plugin to an editing program, according to an embodiment.

FIG. 4 is a flowchart 400 illustrating steps performed by an automation plugin to an editing program, according to an embodiment.

At step 402, the plugin performs the step of allowing a user of the editing program to filter a library of digital assets by custom metadata associated with the digital assets. For example, the plugin may drive a graphical user interface that allows the user to specify the custom metadata filtering criteria. The custom metadata may be associated with the digital assets in an index.

At step 404, the plugin performs the step of obtaining custom metadata filtering criteria. For example, the plugin may obtain the custom metadata filtering criteria from the user as specified through a graphical user interface drive by the plugin.

At step 406, the plugin performs the step of allowing the user to select at least one filtering result, corresponding to one of one or more digital assets that are associated with custom metadata satisfying the custom metadata filtering criteria which, when selected, causes the corresponding digital asset to at least be loaded into the editing program. For example, the plugin may present the selectable filtering results on a graphical user interface driven by the plugin after determining the one or more digital assets that are associated in an index with custom metadata satisfying the custom metadata filtering criteria. The plugin may cause the corresponding digital asset to be loaded into the editing program by invoking an API offered by the editing program that, for example, allows the plugin to load the asset for editing by specifying, for example, an identifier of a container containing the asset. For example, the container may be a file system file and the identifier may be a file system path name to the file.

Basic Computer Hardware

Figure 5:
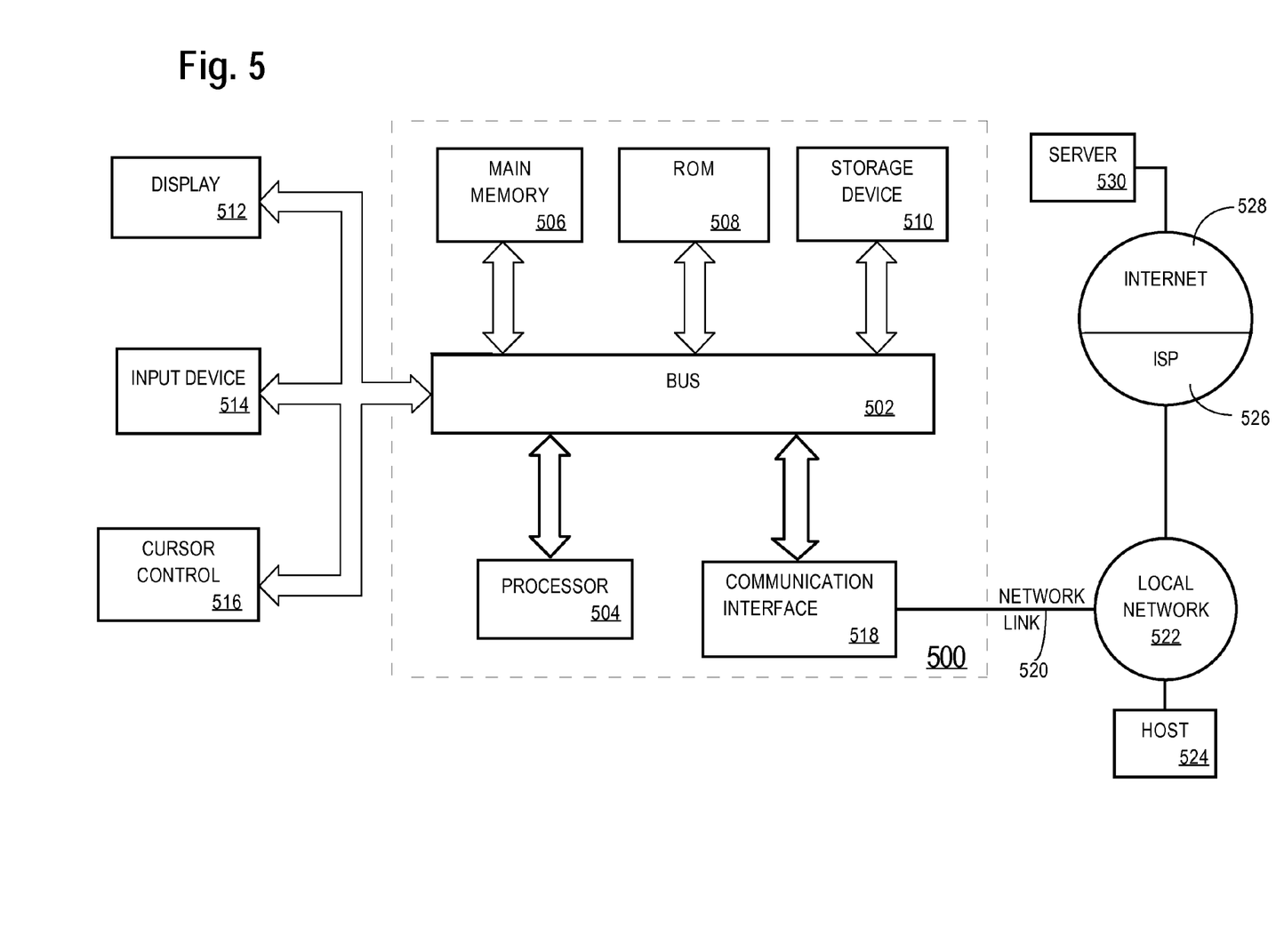
FIG. 5 is a block diagram of a basic computer with which techniques of the present invention may be implemented.

FIG. 5 is a block diagram that illustrates a basic computer system 500 in which some embodiments of the present invention may be embodied. Computer system 500 includes a bus 502 or other communication mechanism for communicating information, and a hardware processor 504 coupled with bus 502 for processing information. Hardware processor 504 may be, for example, a general purpose microprocessor or a system on a chip (SoC).

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk, optical disk, or solid-state drive is provided and coupled to bus 502 for storing information and instructions.

Computer system 500 may be coupled via bus 502 to a display 512, such as a liquid crystal display (LCD) or other electronic visual display, for displaying information to a computer user. Display 512 may also be a touch-sensitive display for communicating touch gesture (e.g., finger or stylus) input to processor 504.

An input device 514, including alphanumeric and other keys, is coupled to bus 502 for communicating information and command selections to processor 504.

Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more application-specific integrated circuits (ASICs), one or more field-programmable gate arrays (FPGAs), firmware, or program logic which, in combination with the computer system, causes or programs computer system 500 to be a special-purpose machine. According to some embodiments, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

A software system is typically provided for controlling the operating of computer system 500. The software system, which is usually stored in main memory 506 and on fixed storage (e.g., hard disk) 510, includes a kernel or operating system (OS) which manages low-level aspects of computer operation, including managing execution of processes, memory allocation, file and network input and output (I/O), and device I/O. The OS can be provided by a conventional operating system such as, for example, MICROSOFT WINDOWS, SUN SOLARIS, or LINUX.

One or more application(s), such as client software or "programs" or set of processor-executable instructions, may also be provided for execution by computer 500. The application(s) may be "loaded" into main memory 506 from storage 510 or may be downloaded from a network location (e.g., an Internet web server). A graphical user interface (GUI) is typically provided for receiving user commands and data in a graphical (e.g., "point-and-click" or "touch gesture") fashion. These inputs, in turn, may be acted upon by the computer system in accordance with instructions from OS and/or application(s). The graphical user interface also serves to display the results of operation from the OS and application(s).

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method performed by a plugin to a digital asset editing program executing on a computing device having at least one processor and memory, the method comprising:

allowing filtering of a library of digital assets by custom metadata associated with the digital assets;

obtaining custom metadata filtering criteria;

responsive to using a digital asset index stored at the computing device to determine that one or more of the digital assets are associated with custom metadata satisfying the custom metadata filtering criteria, allowing selection of at least one filtering result, corresponding to one of the one or more digital assets, which, when selected, causes the corresponding digital asset to at least be loaded into the digital asset editing program for editing;

responsive to a selection of the at least one filtering result, causing the corresponding digital asset to at least be loaded into the digital asset editing program for editing;

wherein the causing the corresponding digital asset to at least be loaded into the digital asset editing program for editing comprises invoking an application programming interface offered by the digital asset editing program;

wherein the application programming interface allows the plugin to at least load a specified digital asset into the digital asset editing program for editing;

receiving notification of a change to a file in a file system of the computing device, the file containing a digital asset in the library;

reading the file for custom metadata embedded in the digital asset; and updating the digital asset index to index the digital asset by the custom metadata read from the file.

2. The method of claim 1, further comprising the plugin performing the steps of:

augmenting a user interface of the digital asset editing program; and displaying the at least one filtering result in the augmented user interface.

3. The method of claim 1, further comprising the plugin performing the step of causing an edit to be automatically performed on the corresponding digital asset based on custom metadata associated with the corresponding digital asset; and wherein the custom metadata associated with the corresponding digital asset indicates the edit to be performed.

4. The method of claim 1, further comprising the plugin performing the step of causing the corresponding digital asset to be positioned on an editing canvas at a position specified by custom metadata associated with the corresponding digital asset.

5. The method of claim 1, further comprising the plugin performing the step of consulting an index, associating digital assets with custom metadata, using the custom metadata filtering criteria as a key into the index.

6. The method of claim 1, further comprising the plugin performing the steps of:

receiving notification of a change to a file system file from a synchronization agent configured to synchronize a synchronization repository at the computing device with a synchronization repository hosted by a content item management service, the file system file comprising a digital asset in the library.

7. The method of claim 1, further comprising the plugin performing the step of forming the custom metadata filtering criteria by combining a filtering criteria expression obtained through a first graphical user interface control with a filtering criteria token obtained through a second graphical user interface control.

8. The method of claim 7, wherein the first graphical user interface control is a text entry form field from which the filtering criteria expression is obtained.

9. The method of claim 7, wherein the second graphical user interface control is a selectable graphical user interface control associated with the filtering criteria token.

10. One or more non-transitory computer-readable media storing a plugin to a digital asset editing program which, when executed by a computing device having at least one processor and memory, causes the computing device to perform the steps of:

allowing filtering of a library of digital assets by custom metadata associated with the digital assets;

obtaining custom metadata filtering criteria;

responsive to using a digital asset index stored at the computing device to determine that one or more of the digital assets are associated with custom metadata satisfying the custom metadata filtering criteria, allowing selection of at least one filtering result, corresponding to one of the one or more digital assets, which, when selected, causes the corresponding digital asset to at least be loaded into the digital asset editing program for editing;

responsive to a selection of the at least one filtering result, causing the corresponding digital asset to at least be loaded into the digital asset editing program for editing;

wherein the causing the corresponding digital asset to at least be loaded into the digital asset editing program for editing comprises invoking an application programming interface offered by the digital asset editing program;

wherein the application programming interface allows the plugin to at least load a specified digital asset into the digital asset editing program for editing;

receiving notification of a change to a file in a file system of the computing device, the file containing a digital asset in the library;

reading the file for custom metadata embedded in the digital asset; and updating the digital asset index to index the digital asset by the custom metadata read from the file.

11. The one or more non-transitory computer-readable media of claim 10, wherein the plugin, when executed by the computing device, further causes the computing device to perform the steps of:

augmenting a user interface of the digital asset editing program; and displaying the at least one filtering result in the augmented user interface.

12. The one or more non-transitory computer-readable media of claim 10, wherein the plugin, when executed by the computing device, further causes the computing device to perform the step of causing an edit to be automatically performed on the corresponding digital asset based on custom metadata associated with the corresponding digital asset; and wherein the custom metadata associated with the corresponding digital asset indicates the edit to be performed.

13. The one or more non-transitory computer-readable media of claim 10, wherein the plugin, when executed by the computing device, further causes the computing device to perform the step of causing the corresponding digital asset to be positioned on an editing canvas at a position specified by custom metadata associated with the corresponding digital asset.

14. The one or more non-transitory computer-readable media of claim 10, wherein the plugin, when executed by the computing device, further causes the computing device to perform the step of consulting an index, associating digital assets with custom metadata, using the custom metadata filtering criteria as a key into the index.

15. The one or more non-transitory computer-readable media of claim 10, wherein the plugin, when executed by the computing device, further causes the computing device to perform the step of receiving notification of a change to a file system file from a synchronization agent configured to synchronize a synchronization repository at the computing device with a synchronization repository hosted by a content item management service, the file system file comprising a digital asset in the library.

16. The one or more non-transitory computer-readable media of claim 10, wherein the plugin, when executed by the computing device, further causes the computing device to perform the step of forming the custom metadata filtering criteria by combining a filtering criteria expression obtained through a first graphical user interface control with a filtering criteria token obtained through a second graphical user interface control.

17. The one or more non-transitory computer-readable media of claim 16, wherein the first graphical user interface control is a text entry form field from the filtering criteria expression is obtained.

18. The one or more non-transitory computer-readable media of claim 16, wherein the second graphical user interface control is a selectable graphical user interface control associated with the filtering criteria token.

\* \* \* \* \*